United States Patent [19]

Huang

[11] Patent Number: 5,503,182

[45] Date of Patent: Apr. 2, 1996

[54] AIR PRESSURE ADJUSTING MODULE BALANCING VALUE AND ITS CHAMBER STRUCTURE

[76] Inventor: Fu-Shiang Huang, 46-1 Kan-Tou, 3 Lin, Jui-Shin Chun, Shin-Feng Hsiang, Hsing-Chu Hsien, Taiwan

[21] Appl. No.: 354,032

[22] Filed: Dec. 6, 1994

[51] Int. Cl.$^6$ .............................. F16F 47/16; G05D 16/06
[52] U.S. Cl. ..................................... 137/484.8; 137/116.5; 137/505.26; 137/544; 251/118; 251/127
[58] Field of Search .......................... 137/505.26, 484.8, 137/116.5, 544; 251/118, 127

[56] References Cited

U.S. PATENT DOCUMENTS

| | | | |
|---|---|---|---|
| 2,613,481 | 10/1952 | Eichelman | 251/118 X |
| 2,661,578 | 12/1953 | Niesemann | 137/505.26 X |
| 3,251,376 | 5/1966 | Worden | 137/484.8 |
| 3,902,522 | 9/1975 | Karenfeld | 137/505.26 X |
| 3,960,358 | 6/1976 | Vollmer et al. | 251/118 X |

*Primary Examiner*—Stephen M. Hepperle
*Attorney, Agent, or Firm*—Bacon & Thomas

[57] ABSTRACT

An air pressure adjusting module compensating balancing valve and its chamber structure is disclosed. A dovetail-shaped rod perpendicular to a horizontal channel is provided at a connection. At the bottom face of the horizontal channel is provided with conic shaped rod parallel to the horizontal channel. The cross-section of the horizontal channel has a circular arch shaped lower end. The outlet of the horizontal channel is a recessed face. At the bottom of the section of the horizontal channel is provided with an overflow channel having a slanting face at the bottom face thereof. A dovetail-shaped partition is provided at the bottom face of the overflow channel to partition the overflow channel into two sides, such that the air into the inlet and flows out from the outlet will obtain a higher flow rate ratio and the pressure is stable as laminar flow.

8 Claims, 9 Drawing Sheets

AIR PRESSURE ADJUSTING MODULE BALANCING VALUE AND ITS CHAMBER STRUCTURE

BACKGROUND OF THE INVENTION

The present invention relates to an air pressure adjusting module compensating balancing valve and its chamber structure, in particular to a structure which provides a greater flow rate with adjusted pressure after the air has been filtered, and the output air is very stable.

Figure 8:
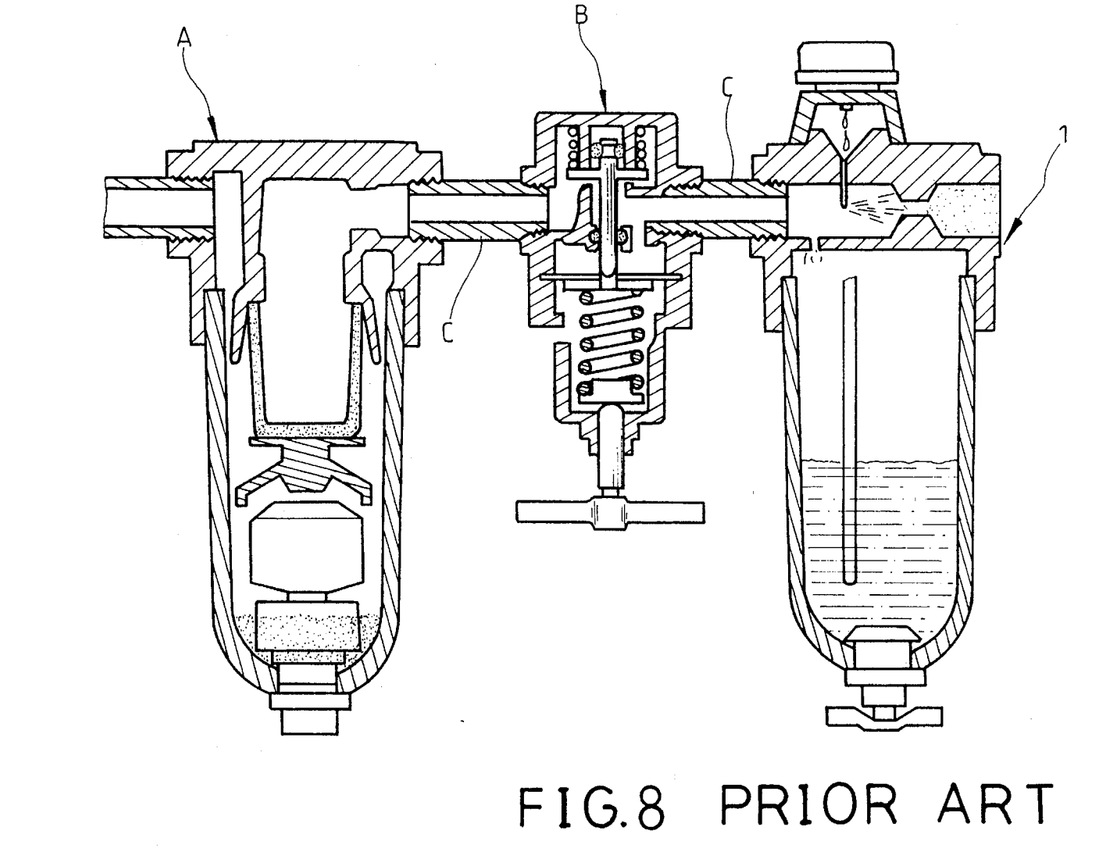
FIG. 8 is the sectional view of another prior art pressure adjusting module structure.

In conventional air filter, a filter machine, pressure adjusting machine and oil supply machine are combined as showed in FIG. 8. They are connected with each other with tubes and the compressed air via the filtering machine, air adjusting machine and oil supply machine will be affected by the small rallies of the connectors, therefore, eddy current, turbulent current and pressure drop will produced.

Figure 7:
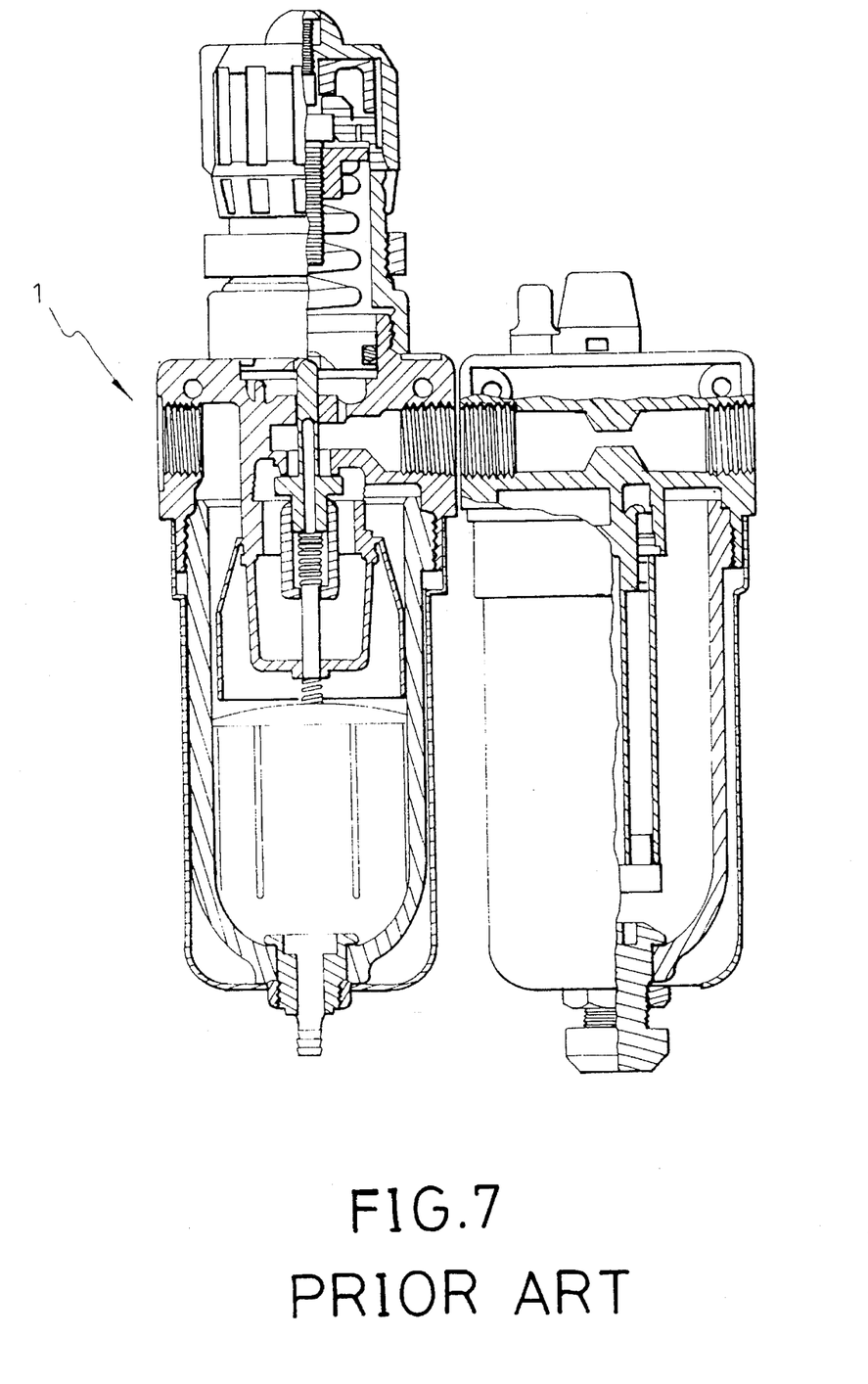
FIG. 7 is the sectional view of a prior art pressure adjusting module structure.

Other conventional air pressure adjusting module is formed from the combination of an air filter and an air pressure adjusting valve as a unit (as shown in FIG. 7). The air is first passed through the filter-adjusting machine and then passed into the oil supply machine. The structure of this filter-adjusting machine consists of a filter apparatus and a pressure-reducing valve, such that the air passed through the filtering apparatus is first filtered and then pressure reduced to a required pressure and passed to the oil supply machine. The air pressure is classified as atmospheric pressure, the primary pressure and the secondary pressure. The primary is referred to the maximum pressure at the pressure valve after the air entered the machine. The secondary is referred to the primary air pressure passed the pressure valve. As shown in FIG. 8, when the pressure of the secondary valve increases the secondary pressure is too high and cannot be released, thus the reaction of the pressure adjusting valve is slow. If flow rate compensation is equipped, a partition is formed between the membrane chamber and the flow rate channel, with only one nozzle as their communication as the release channel for the secondary pressure, thus, the reaction of the pressure adjusting valve is fast.

SUMMARY OF THE INVENTION

The object of the present invention is to provide an air pressure adjusting module balancing valve and the chamber structure, wherein the interior chamber of the connecting port of the adjusting machine is provided with multiflow structure, at the center region of the bottom of the horizontal channel is provided with an angled wall perpendicular to the horizontal channel, a conical extension is provided at the end face of the horizontal channel such that when the air pressure flows to the horizontal channel, it will pass the angled wall and the conical extensions and the impact speed is reduced to form stable flow so as to obtain a high flow rate ratio.

It is another object of the present invention to provide a balancing valve and its chamber structure, wherein in the cross-section of the horizontal channel is circular arch-shaped to direct the air to produce parallel movement, the top end of the horizontal channel forms a recessed face such that when the air flows to the outlet, an eddy current is produced such that the air will produce a driving force.

It is yet another object of the present invention to provide a balancing valve and a chamber structure, wherein the secondary pressure can be released through the releasing valve after it passed through the pressure adjusting valve.

The attainment of the foregoing and related objects, advantages and features of the invention should be more reading apparent after review of the following more detailed description of the invention, taken together with the drawings, in which:

BRIEF DESCRIPTION OF THE INVENTION

DETAILED DESCRIPTION OF THE INVENTION

Figure 1:
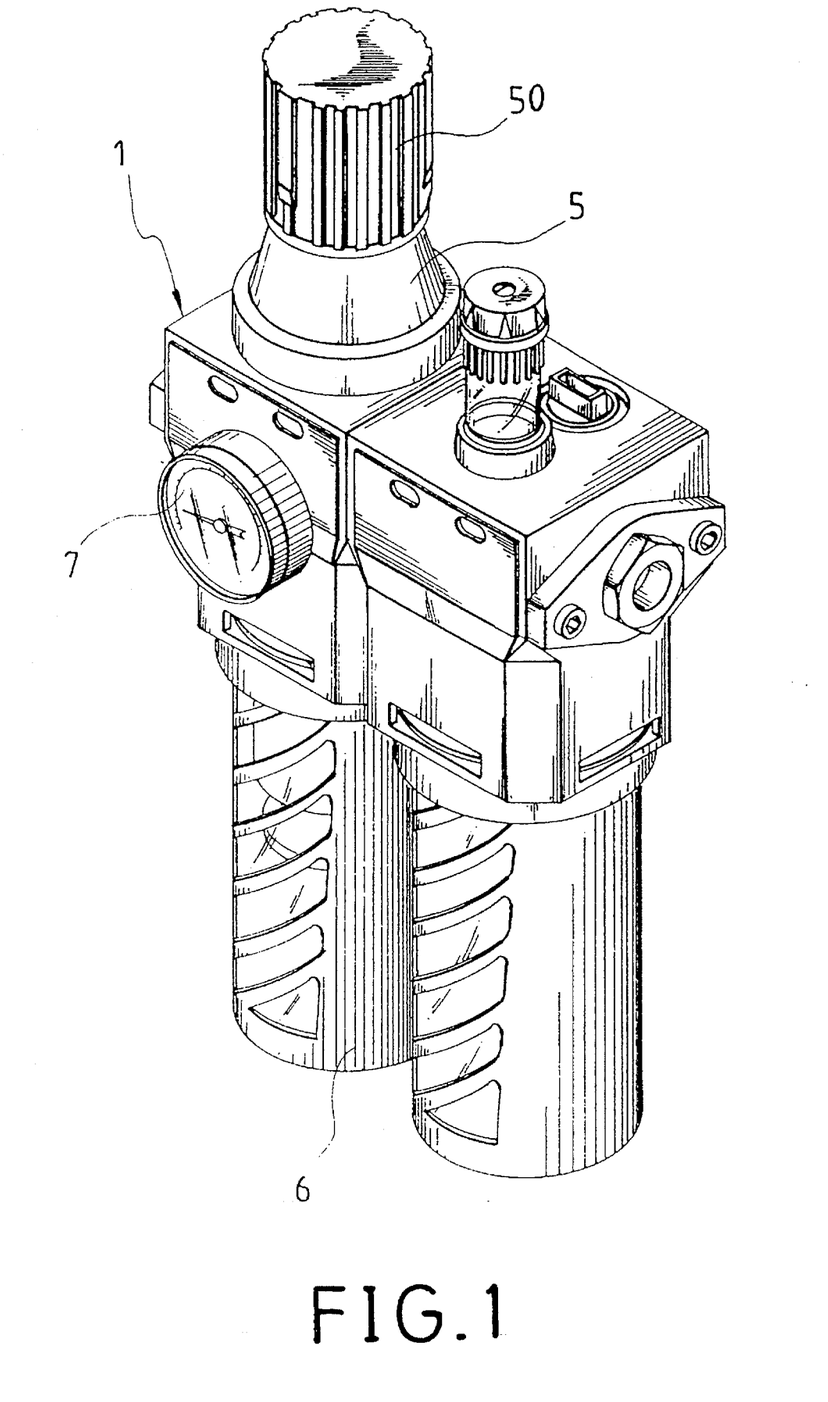
FIG. 1 is a perspective view showing the combination of an oil supply device with the present invention.
Figure 2:
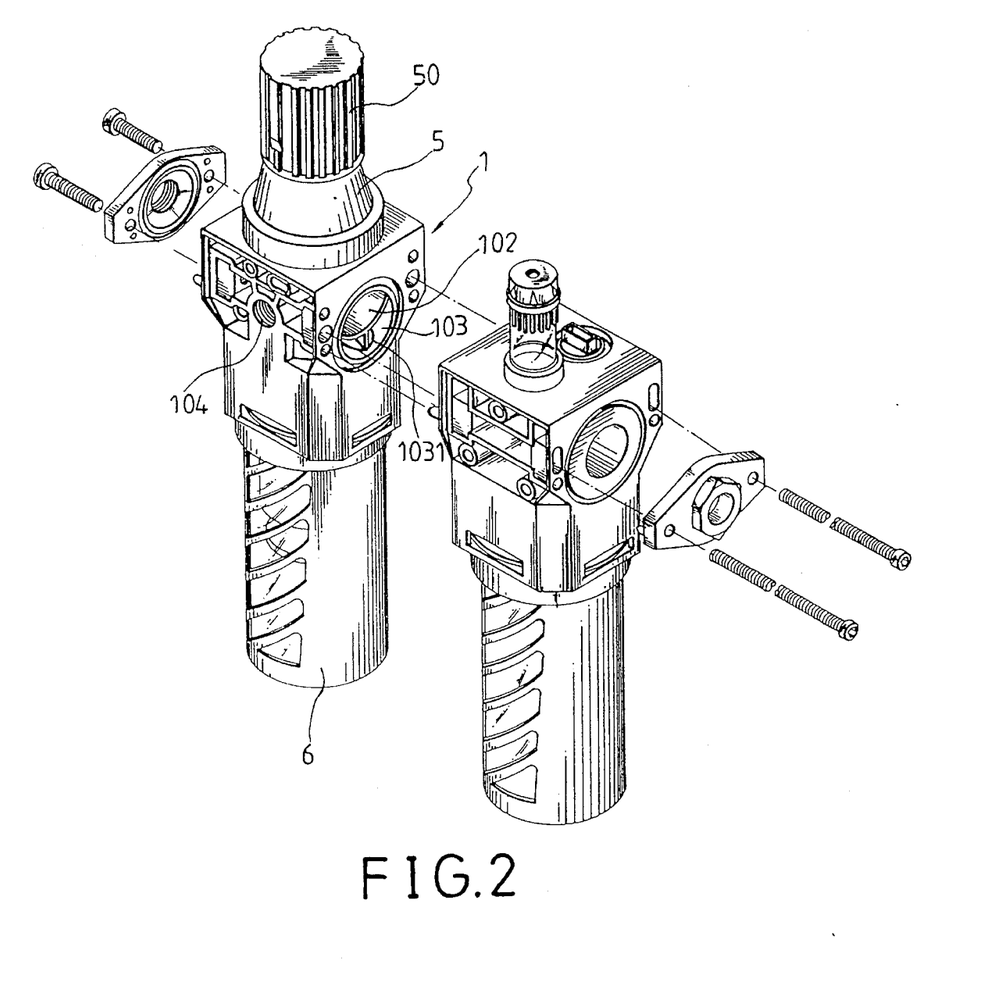
FIG. 2 is a perspective, exploded view showing the combination of an oil supply device with the present invention.

Turning now to the drawings, more particularly to FIGS. 1 and 2, there is shown an air pressure adjusting module balancing valve and the chamber structure. It is used in the filter pressure adjusting device 1 of the air pressure adjusting module. It is formed with the oil supply device as a unit and the water content, debris in the air are filtered and reduced the pressure and then supplied to the oil supply device. The compressed air mixed with the air atomized lubricating oil and then supplied to the pressure equipment reading for application.

Figure 3:
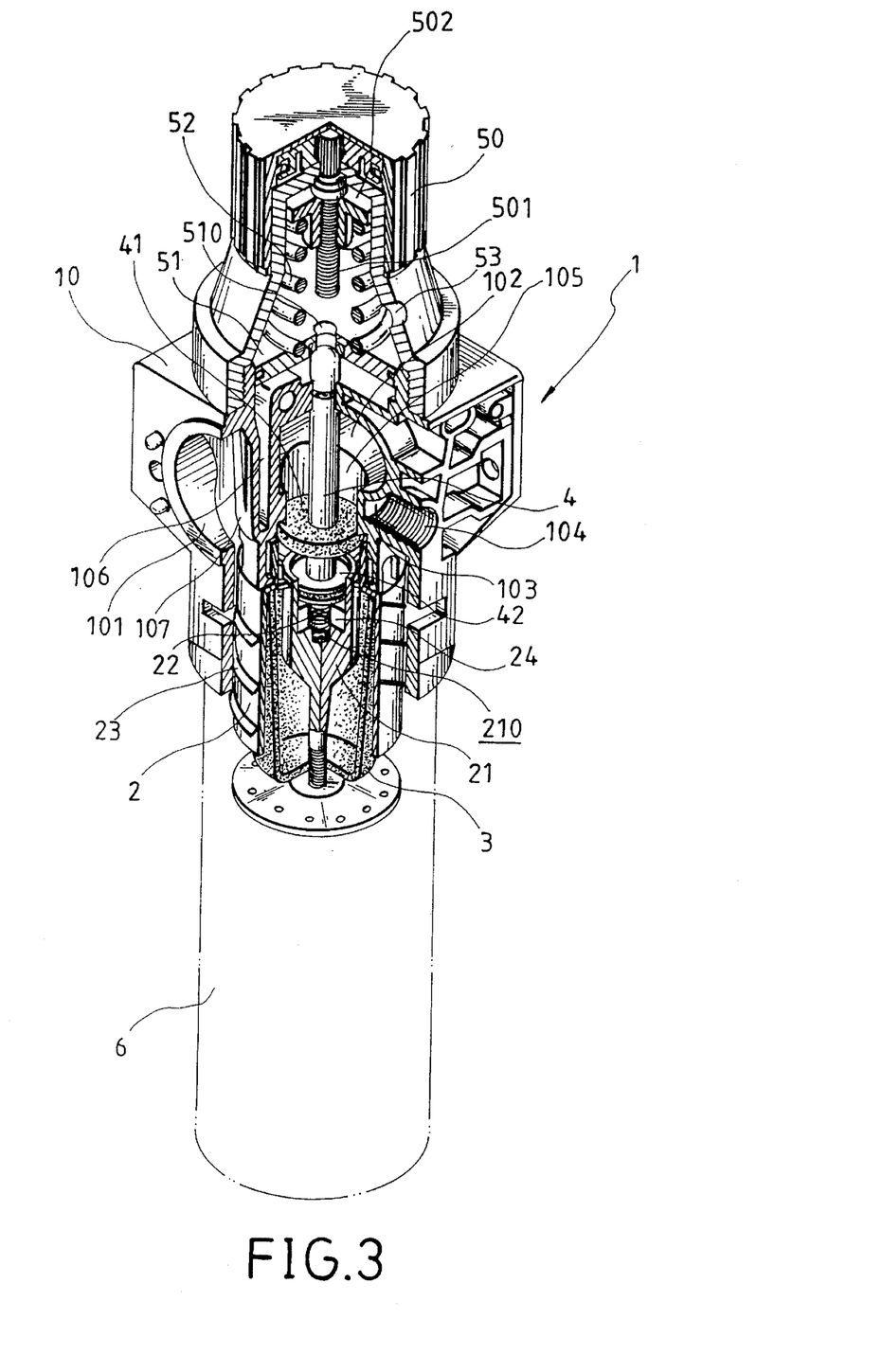
FIG. 3 is a sectional view of the present invention.
Figure 4:
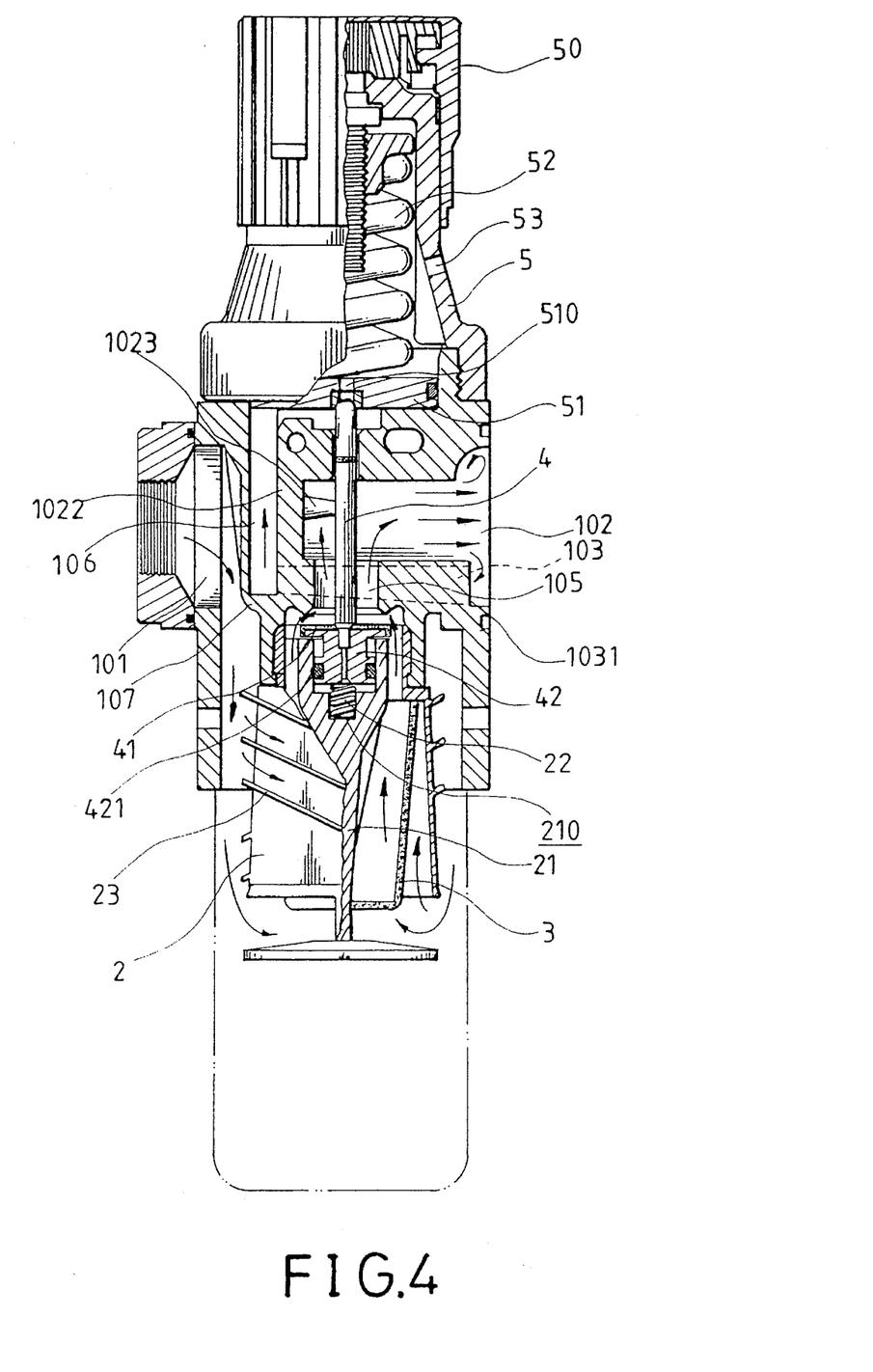
FIG. 4 is a cross-sectional view showing the flow of air in accordance with the present invention.

As shown in FIGS. 3 and 4, the structure in accordance with the present invention has an air inlet 101 and an outlet corresponding to said inlet 101. An air flow channel for air is provided between the air inlet 101 and the outlet. The air flow channel is formed within the body 10, which is provided with an inner pipe 107 having a vertical channel 105. The lower end of said inner pipe 107 is mounted to a filtering device. The upper end is connected to a horizontal channel 102 and directly connected to said air outlet. The position of the air inlet 101 and the outlet is higher than the lower end of the inner pipe 107, such that the air passing from the air inlet 101 to the outlet has to pass more curve and thus reduce the impact force to the fluid, and the water content and debris can be removed. The lower end of the body 10 is provided with a cup 6 for the collection of the filtered debris.

The structure of the air filtering device consists of a outer shell 2 having a plurality of disc 23. The interior of the outer shell 2 is hollow and is mounted with a center rod 210 The top end of the center rod 21 is provided with a guiding hole 24. A mounting hole 210 is provided at the bottom of the guiding hole. A core 3 is provided within the outer shell 2.

Figure 5:
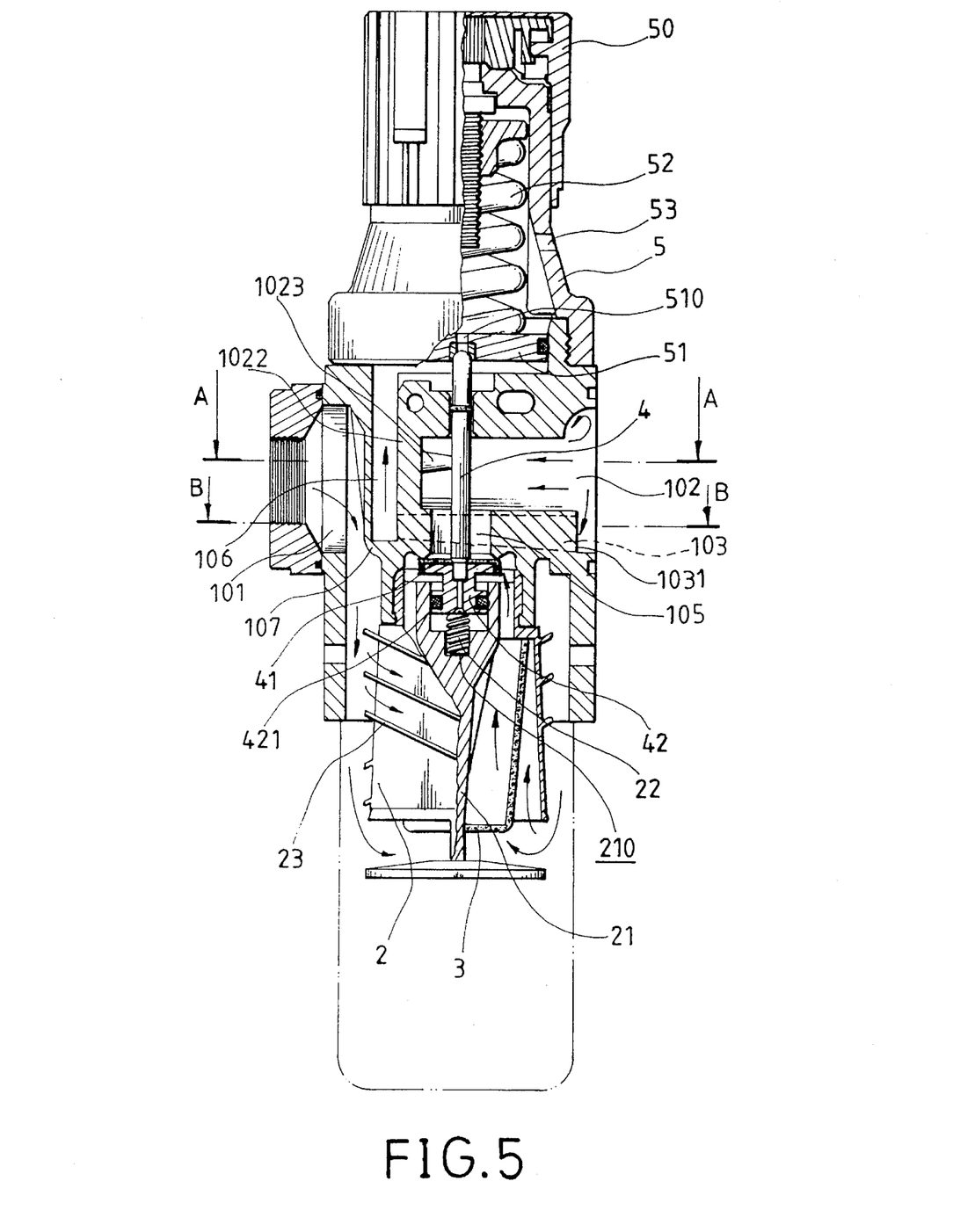
FIG. 5 is a sectional view showing the closing of the valve in accordance with the present invention.
Figure 5A:
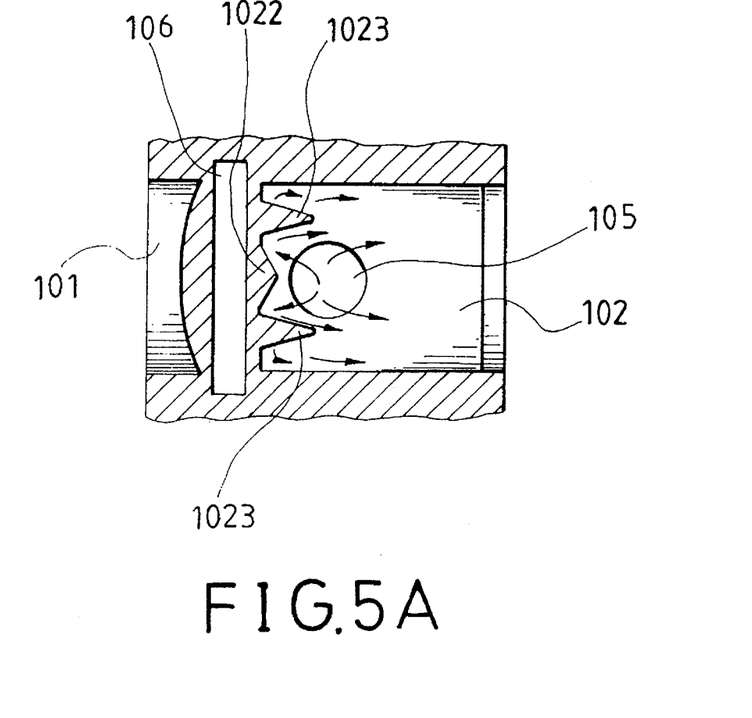
FIG. 5A is a sectional view via line A—A of FIG. 5.
Figure 5B:
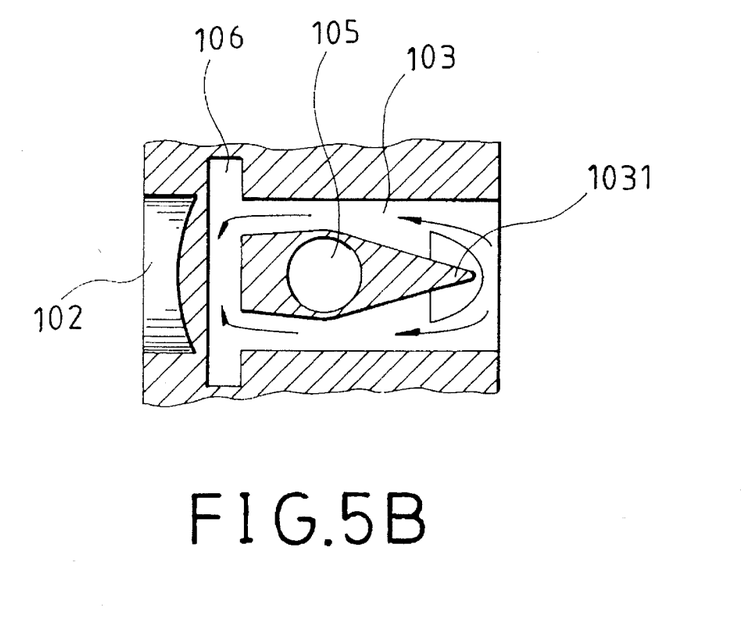
FIG. 5B is a sectional view via line B—B of FIG. 5.
Figure 6:
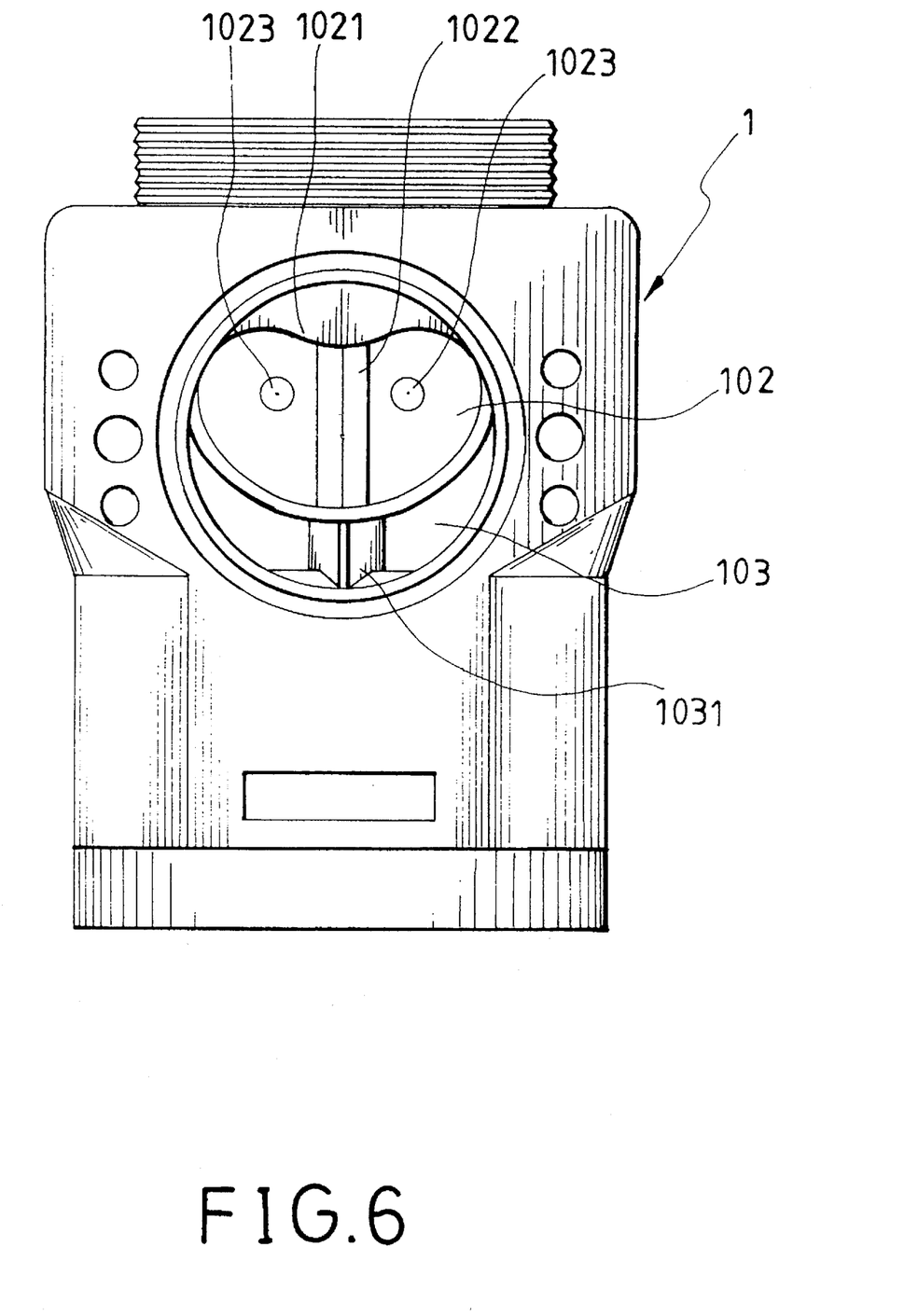
FIG. 6 is a plane view showing outlet port of the filter-adjusting module in accordance with the present invention.

As shown in FIG. 5A, the bottom face of the horizontal channel 102 intersects with the vertical channel 105. At the center region of the vertical bottom face of the horizontal channel 102 is provided with an angled wall 1022 having conical extensions 1023 mounted at the lateral sides of the angled wall 1022. The conical extensions 1023 are is parallel to horizontal channel 102. The outlet at the outer end of channel 102 is formed with a recessed face 1021 (as shown in FIG. 6). An overflow channel 103 is provided at the lower section of the horizontal channel 102. The bottom face of the overflow channel 103 is provided with a slanting face having extended to its front end a wedge shape partition 1031 (as shown in FIG. 5B), such that the overflow channel 103 is divided respectively into two sides, such that the inlet of the overflow channel is wider and the inner is narrower. The bottom of channel 103 is provided with an overflow slot 106 which is connected to the overflow channel 103. The lateral side of body 10 is provided with screw hole 104 in communication with overflow channel 103. The screw hole 104 is used for the mounting of a pressure gauge to measure the pressure of the channel 103. At the lower section of the vertical channel 105 a pressure balancing valve 41 having the top end being connected to a moving rod 4 is provided. The upper end of the moving rod 4 is mounted with a pressure adjusting device. The lower end of the pressure balancing valve 41 is provided with a guiding disc 42. The guiding disc 42 is mounted at the guiding hole 24 of the center rod 21 of the outer shell 2. The outer edge of the guiding disc 42 is provided with a balancing rubber ring 421 such that the ring 421 is in-between the guiding disc 42 and the mounting hole 210, such that the reciprocating of the moving rod 4, the action of the ring 421 provides a balancing effect to said rod 4, and at the same time, it provides a sealing effect. In addition, the interior of the mounting hole 210 is provided with an elastic element 22. The upper end of the element 22 urges the lower and of the guiding disc 42 such that the balancing valve 41 and the moving rod 4 tend to move upward. The pressure balancing valve 41 is made of rubber material which provides an excellent sealing effect.

At the top end of the body, a recess is provided. The top end is a seat body 5, and the lateral wall of the body 5 is provided with air hole 53. A plug 51 is provided within the recess. The center region of the bottom of the plug 51 is provided with rubber pad. A secondary pressure valve 510 is provided at the center region, such that the upper end of the rod 4 moves from the bottom to the top to urge the valve 510 and then to seal the valve 510. By means of the rubber seal, the moving of the rod 4 and the plug 51 provides the function as a secondary valve 510. At the moving rod 4 a sealing ring is provided to stop the flow of air pressure. The top end of the plug 51 is provided with an elastic element 52. The top end of the element 52 is provided with moving cover 502 having inner screw threads. The threads can be mounted with a bolt 501. A screw cap 50 is provided at the top of the bolt 501 and is mounted to the exterior of the seat body 5 to cover the elements within the seat 5, such that when the cap 50 is screwed, the bolt 501 can be controlled to rotate at the original position and the bolt 501 will either move up or down and adjust the reaction force of the elastic element 52 with respect to the plug 51, and at the same time, control the downward pressure of the balancing valve 41.

As shown in FIG. 4, the cap 50 is rotated to adjust the compression of the elastic element 52 and thus control the resistance force of the plug 51 with respect to the moving rod 4.

By means of the load valve of the elastic element 52, the pressure balancing valve 41 moves downward and thus opens the valve of the vertical channel 105. The air moves from the exterior of the device via the inlet 101 into the body 10. By means of the guiding of the screw disc 23, a rotating air is formed, and enters the outer shell 2 via the bottom portion of the outer shell 2. After that, it passes through the core 3 to filter the debris and water content, and opens the pressure balancing valve 41 and arrives at the horizontal hole 102. Then, the air passes from the outlet into the oil supply device. The air that passes through the filter-pressure adjusting machine 1 but does not pass through the pressure balancing valve 41 has the largest valve within the machine. This pressure is referred to as "primary pressure". When the compressed air having the primary pressure passes to the horizontal channel 102 from the vertical channel 105, it passes via the angled wall 1022 and the conical extensions 1023 and the impact speed of the air is adjusted to a more stable air stream and flows as shown in FIG. 5-1. The air pressure after passes through the pressure balancing valve 41 is known as "secondary pressure". Normally, the secondary pressure is smaller than the primary pressure. By means of the guiding of the connection port of the recessed face 1021, the air flow after passes through the air outlet is more stable. Due to the circular arch-shape of the lower end of the horizontal channel 102 and the recessed face 1021 of the outlet, the air flow becomes a rotating movement which produces a driving force. In addition, the inlet of the overflow channel 103 is in communication with the horizontal channel 102, the secondary pressure will passes through the overflow channel 103 and the overflow slot 106 and causes the plug 51 to acquire an upward force. When the air pressure equipment was exerted with resistance or with longer load, the secondary pressure within the horizontal channel 102 increases and urges upward the plug 51. At the same time, the valve body 42 of the pressure balancing valve 41 will move upward as a result of the elastic force of the elastic element 22 until the vertical channel 105 is sealed. This will avoid the compressed air having the primary pressure to flow continuously into horizontal channel 102. If the secondary pressure is increased continuously and the pressure balancing valve 41 has urges the vertical channel 105, the plug 51 moves upward continuously to cause the primary pressure release valve 510 to separate with the moving rod 4. At this instance, the excessive high secondary pressure is thus released, and this causes a pressure balance within the machine. When the plug 51 moves upward the air at the plug 51 will be released via the hole 53 and thus, the plug 51 can be moved smoothly. Until the resistance faced by the air pressure equipment has been removed and the air pressure within the horizontal channel 102 is smaller than the elastic force of the elastic element 52. By means of the elastic force of the elastic element 52, the plug 51, moving rod 4 and the pressure balancing valve 41 are moved downward at the same time to open the lower end of the vertical channel 105. This allows the air to continuously supply to the horizontal channel 102 and then enter the lubricating oil machine and the air pressure equipment. This provides a balanced pressure to the whole system. Due to the fact that the overflow channel 103 is provided at the lower section of the horizontal channel 102 and mutually parallel to each other, and the multiflow structure in accordance with the present invention, the higher pressure at the horizontal channel 102 will provide a balancing effect and this causes the plug 51 to react rapidly and allows the compensation of flow rate of air.

The nature of the present invention, having been sufficiently described, as well as its industrial implementation, it need only be added that it is possible to introduce changes of form, material, and arrangement to the invention as a whole and its component parts without departing from the framework of the invention, in as much as such alternations do not invalidate its basis.

I claim:

1. An air pressure adjusting module balancing valve and the chamber structure characterized in that a filter-pressure adjusting device has an interior chamber for the mounting of a multiflow structure, said multiflow structure comprising a horizontal channel and a vertical channel mutually intersecting at a bottom face of said horizontal channel; an angle wall extending perpendicular to said horizontal channel located in a center region of an end face of the horizontal channel; at least one conical extension extending from the end, face of the horizontal channel such that as the air flows from the vertical channel into the horizontal channel, the angled wall and the at least one conical extension retard the impact speed of the air flow and form a steady air stream.

2. The chamber structure as set froth in claim 1, further comprising an overflow channel located below the horizontal channel and an overflow slot in communication with said overflow channel.

3. The chamber structure as set forth in claim 2 further comprising a wedge shape partition located in said overflow channel to divide the overflow channel into two sides.

4. The chamber structure as set forth in claim 1, wherein the horizontal channel has a generally arc-shaped cross-sectional configurationr.

5. The chamber structure as set forth in claim 1, further comprising a recessed face located at an outer end of said horizontal channel to allow the smooth flow of air stream.

6. The chamber structure as set forth in claim 1, further comprising a recess formed on an upper end of said filter-pressure adjusting device and a plug is provided within said recess.

7. The chamber structure as set forth in claim 6 further comprising an elastic element mounted on top of said plug.

8. The chamber structure as set forth in claim 7, further comprising a rotatable cap provided on a top of a bolt mounted within a movable cover located at a top end of said elastic element.

* * * * *